US006461672B1

United States Patent
Kosola et al.

(10) Patent No.: US 6,461,672 B1
(45) Date of Patent: Oct. 8, 2002

(54) SYMMETRICAL FLUIDIZATION COATER FOR HIGH CAPACITY MANUFACTURING

(75) Inventors: Antti Kosola, Kirkkonummi (FI); Ryszard Braun, Rochester, NY (US); Nathaniel T. Becker, Hillsborough; Robert L. Christensen, Jr., Pinole, both of CA (US); Ville Kyläkoski, Karjaa (FI); Alfred L. Gaertner, San Bruno, CA (US)

(73) Assignee: Genencor International, Inc., Palo Alto, CA (US)

( * ) Notice: Subject to any disclaimer, the term of this patent is extended or adjusted under 35 U.S.C. 154(b) by 32 days.

(21) Appl. No.: 09/640,394

(22) Filed: Aug. 16, 2000

(51) Int. Cl.⁷ .................................. B05D 7/00
(52) U.S. Cl. ................. 427/213; 427/212; 118/803; 118/418
(58) Field of Search ............... 118/303, 309, 118/417, 418, 716; 427/213, 421, 424

(56) References Cited

U.S. PATENT DOCUMENTS

| 3,908,045 A | * | 9/1975 | Alterman et al. | ........ 252/187.1 |
| 4,118,524 A | * | 10/1978 | Saeman | ............... 252/186.37 |
| 4,530,169 A | * | 7/1985 | Okawara | ................. 34/582 |
| 4,664,944 A | * | 5/1987 | Hsu et al. | ................. 117/102 |
| 5,955,036 A | * | 9/1999 | Seyffert et al. | ............ 208/426 |

* cited by examiner

Primary Examiner—Michael Barr
Assistant Examiner—Rebecca A. Blanton
(74) Attorney, Agent, or Firm—Kilyk & Bowersox, P.L.L.C.

(57) ABSTRACT

A fluidized bed coating apparatus is provided and includes a fluid inlet adapted to be connected to a source of fluidizing fluid. The fluid inlet has an entrance opening having a first diameter and an exit opening downstream of the entrance opening. The exit opening has a second diameter that is larger than the first diameter. The inlet also includes an expanding inlet section, between the entrance opening and the exit opening, that has an average diameter that increases in a direction from said entrance opening to said exit opening. A fluid distribution plate is provided adjacent the exit opening and includes a plurality of through-passages to allow the even and distributed passage of a fluidizing fluid therethrough. A chamber having a chamber inlet and a chamber outlet is provided and the fluid distribution plate is positioned between the exit opening and the chamber inlet. The chamber includes at least a first diverging section having an average diameter that increases in the direction from the chamber inlet downstream toward the chamber outlet. The symmetrical design of the coater provides an evenly distributed flow of fluid that enables efficient and complete fluidization and coating of very large particle beds.

29 Claims, 3 Drawing Sheets

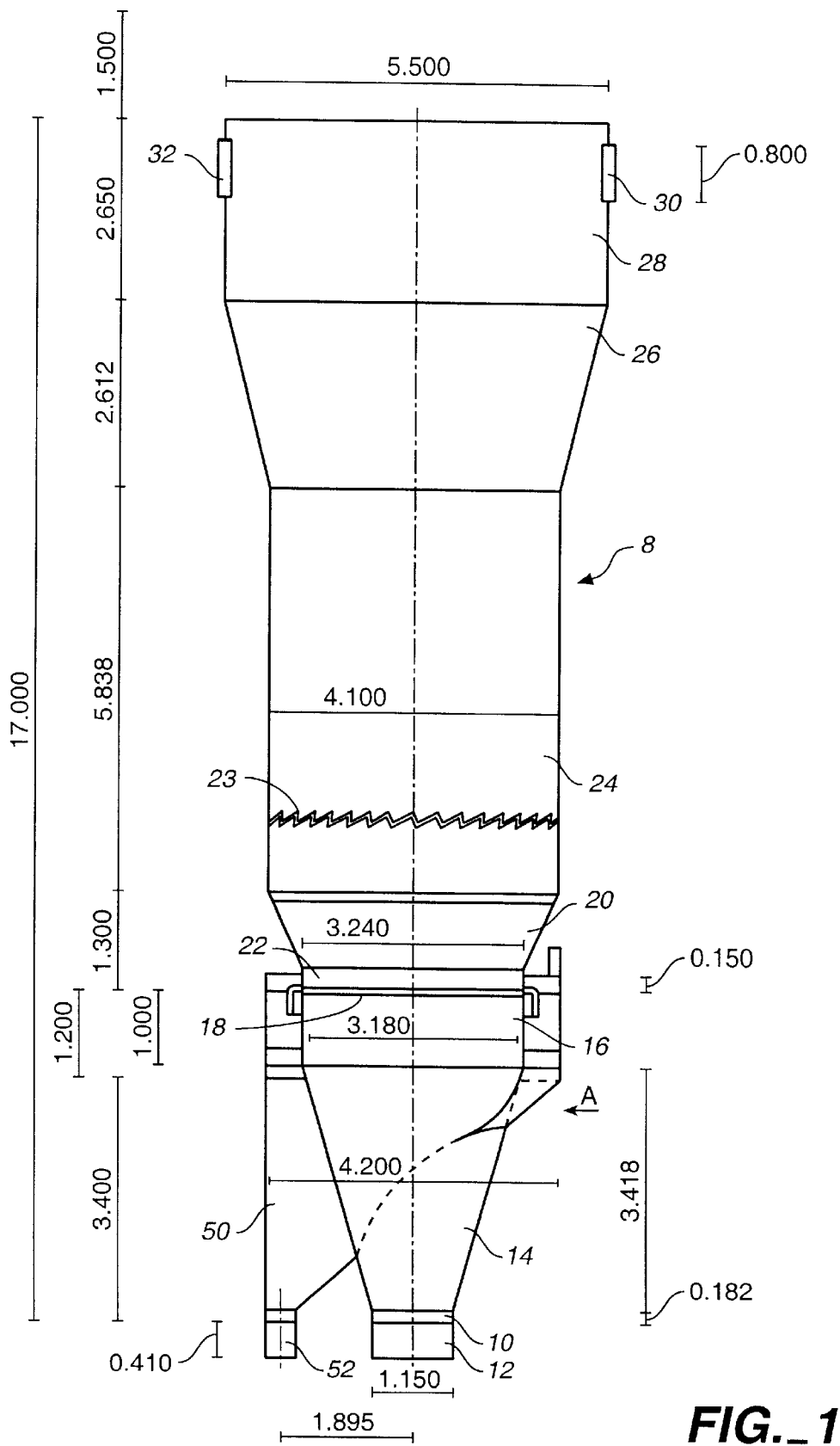
FIG._1

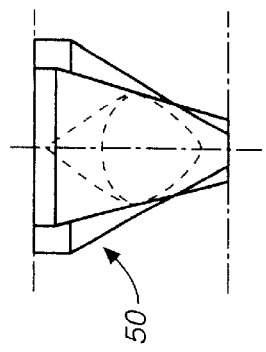
FIG._4
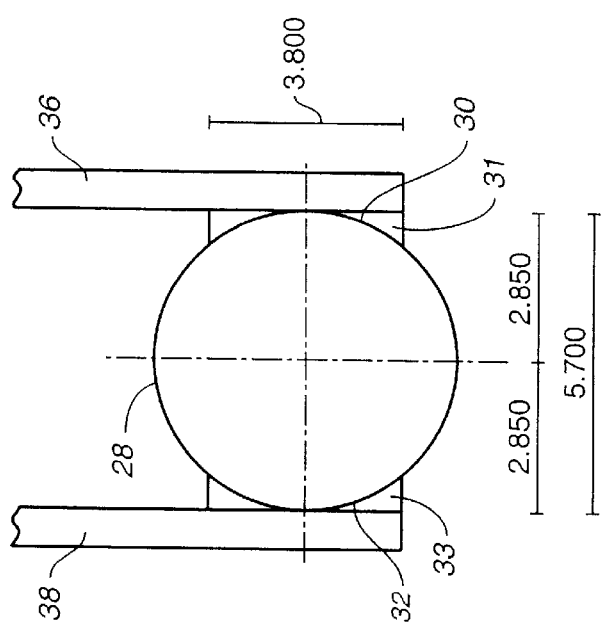
FIG._3
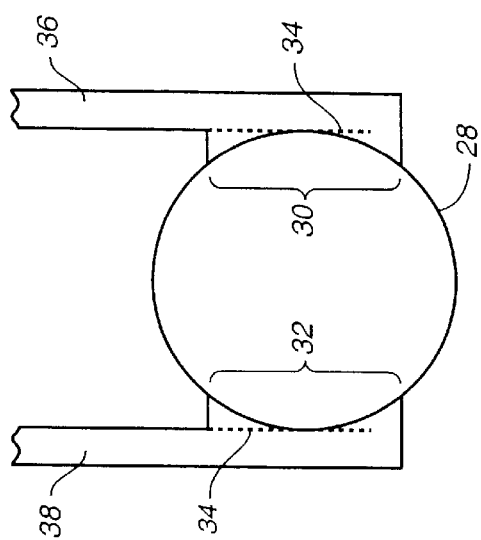
FIG._2

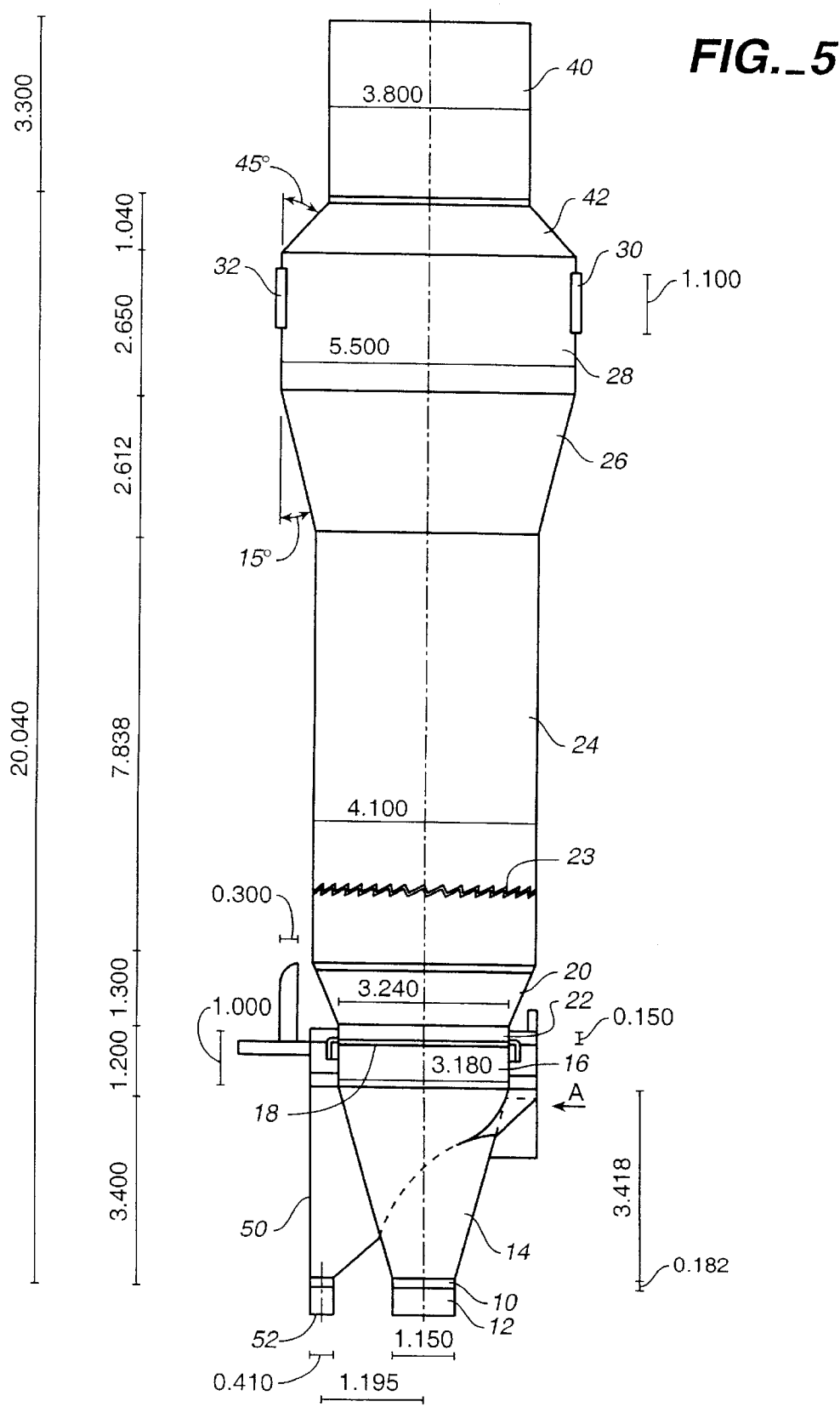
FIG._5

SYMMETRICAL FLUIDIZATION COATER FOR HIGH CAPACITY MANUFACTURING

BACKGROUND OF THE INVENTION

The present invention relates to a fluidization coaters for manufacturing coated particles, for example, coated enzyme granules.

Fluidization coaters are useful in coating a bed of particulate seed material or core material to form a coated particulate product. In operation, fluidization coaters continuously fluidize a bed of particles to be treated by lifting the bed of particles in a fluid flow of sufficient air flow volume and velocity to lift the particles and form fluidized bed. The weight of the bed of particles to be coated is limited by the air flow volume and velocity capacities of the fluidization coater. When too heavy a bed of particles is treated in the coater, the weight of the bed of particles can be too great to be fluidized such that dead spots or dead spaces occur in the bed of particles where no fluidization takes place. As a result, the batch of particles resulting from such a process are not uniformly coated and can contain large agglomerates of particles, and uncoated particles. While it has been desirable to process large beds of particles in view of economic concerns, conventional fluidization coaters have been limited in the size of particulate beds that can be processed.

Increasing the air flow and air flow velocity of the fluid flow through a fluidization coater can result in a better ability to fluidize large particle beds, however, in traditional fluidization coaters, increasing the fluid flow and/or fluid flow velocity can lead to a loss of particles through the coater outlet. Therefore, a balance must be reached whereby a fluid flow volume and velocity are used that achieve fluidization of a particulate bed without using too much flow that would lead to undesirably exhausting particles through the coater outlet. It is desirable to provide a fluidization coater that can fluidize and process extremely large beds of particles without wasting particles though an exhaust outlet.

Other problems have been encountered in trying to coat a bed of particles with a fluidization coater. Singular narrow outlets have caused local velocity inconsistencies in coaters including higher local velocities near the outlet, facilitating product "fly out" through the coater outlet. Narrow, one-sided fluid outlets also cause non-laminar fluid flow throughout other areas of the coating apparatus resulting in poor fluidization of the bed. Using lower fluid flows to control these problems has not worked and leads to lower manufacturing capacities, bouncing action in the fluidized bed, and difficulties optimizing production as product is fluidized better in one corner or on one side of the apparatus than in another corner or on another side.

Bent, curved, or elbow-jointed inlets have also caused inconsistencies in local fluid flow velocities through coaters. Non-linear inlets have led to fluid flows that are not evenly distributed across a particle retention screen but instead that are of stronger flow volume and/or velocity on one side of the coater than on another side. Thus a portion of a bed above one area of the particle retention screen is often vigorously fluidized while a portion of the bed above a different area of the same screen is not sufficiently fluidized.

As a result of the above problems, undesirable product losses are realized, heat-transfer is inefficient, drying times are increased, production capacity is decreased, and hotter drying temperatures are needed.

SUMMARY OF THE PRESENT INVENTION

The present invention provides a fluidization coater that can process extremely large particle beds while minimizing particle loss through the exhaust outlet of the coater. The present invention achieves this objective by providing a device having a symmetrical design and features that enable an even and uniform distribution of a fluidization flow homogenously through a bed of particles to efficiently fluidize the bed while not causing particles from the bed to be exhausted through a coater outlet. The design of the present invention includes one or more diverging sections in the coating apparatus that reduce the fluid flow velocity by increasing the diameter along the flow path of the fluidization flow. As the diameter increases in the diverging diameter section or sections, the fluid flow velocity decreases sufficiently to allow fluidized particles to settle by gravity back down into the fluidized bed of particles. Throughout the fluidization coater, a symmetrical, even and homogenous flow of fluid is provided. The apparatus can be used in a method of treating particles that benefits from increased capacity, less product loss, better heat transfer properties, better and more uniform coating properties, better drying capacity, better fluidization, and an overall better use of energy compared to conventional fluidization coaters.

Throughout the fluidization coater, a symmetrical, even and homogenous flow of fluid is provided. The apparatus can be used in a method of treating particles that benefits from increased capacity, less product loss, better heat transfer, better and more uniform coating properties, better drying capacity, better fluidization, and an overall better use of energy compared to conventional fluidization coaters.

According to embodiments of the present invention, an evenly distributed fluid flow is passed through a fluid distribution and particle retention plate, herein referred to as a fluid distribution plate, to evenly fluidize a bed of particles otherwise resting on the plate. The inlet system of the device according to the present invention provides a laminar, non-turbulent flow of fluid to the fluid distribution plate which enables the uniform distribution of fluid through the particle bed.

In accordance with an embodiment of the present invention, a fluidized bed coating apparatus is provided that includes a fluid inlet adapted to be connected to a source of fluidizing fluid. The fluid inlet has an entrance opening having a first diameter, an exit opening having a second diameter that is larger than the first diameter, and an expanding inlet section between the entrance opening and the exit opening that has an average diameter that increases in a direction from the entrance opening to the exit opening. The coating apparatus further includes a fluid distribution plate having a plurality of through-passages to allow the passage of fluid therethrough. The fluid distribution plate has an average diameter substantially equal to the average diameter of the exit opening. The side of the fluid distribution plate opposite the side adjacent the exit opening faces a chamber. The chamber has a chamber inlet and a chamber outlet, wherein the fluid distribution plate is positioned between the exit opening and the chamber inlet. Preferably, the chamber has at least a first diverging section having a diverging average diameter that increases in the direction from the chamber inlet toward the chamber outlet. The first diverging section of diverging average diameter provides a fluid flow velocity downstream of the first diverging section that is substantially slower than the fluid flow velocity of fluid reaching the first diverging section from upstream. The coating apparatus also includes a fluid outlet downstream of the chamber outlet for exhausting fluidizing fluid from the coating apparatus.

In accordance with the preferred embodiments of the present invention, the fluid outlet intersects with the chamber outlet at an exhaust port and the exhaust port has an area that is from about 10% to about 130% of the cross-sectional area of the chamber, preferably from about 50% to about 100%.

According to a preferred embodiment of the present invention, the chamber includes first and section diverging sections, each of which has a first diameter at a lower end or first end and a second diameter at an upper end or second end wherein the second diameter is larger than the first diameter. Preferably, the exhaust port includes openings on opposite sides of the chamber.

The coating apparatus of the present invention is preferably of sufficient size and design to employ a fluid flow of from more than about 30,000 m³/hr to about 100,000 m³/hr, or more, and can handle particle beds weighing in excess of 5000 metric tons, for example, beds weighing in excess of 10,000 metric tons. The design can be used with much smaller particle beds to achieve even and homogenous fluid distribution and coating of the particles.

The present invention also relates to a method of coating particles in a bed of particles through the use of a fluidization coater according to the present invention.

BRIEF DESCRIPTION OF THE DRAWINGS

FIG. 1 is a plan view of a coating apparatus according to an embodiment of the present invention showing various dimensions of various parts of the apparatus;

FIG. 2 is a top view of the top section and exhaust outlet of the apparatus of FIG. 1;

FIG. 3 is a top view of a top portion of a coating apparatus according to an embodiment of the present invention, showing the dimensions of the top of the second diverging section and the dimensions of the exhaust outlet;

FIG. 4 is a side view in partial phantom showing the side discharge device as viewed from perspective A shown in FIGS. 1 and 5; and FIG. 5 is a side view of another embodiment of the present invention showing various dimensions of various parts of the apparatus.

DETAILED DESCRIPTION OF THE PRESENT INVENTION

The present invention relates to a coating apparatus for forming coated particles such as coated enzyme granules. The coating apparatus includes a symmetrical design that enables uniform, even and thorough fluidization of extremely large volumes and weights of coated particles and particles to be coated. The design eliminates dead spaces within a bed of particles to be treated and provides an even distribution of fluid throughout the particle bed. The design enables the treatment of particle beds weighing in excess of five metric tons, for example, particle beds in excess of ten metric tons. Processing this volume and weight of particles has heretofore been unachievable due to the dead spaces and mud-like cakes that form when large quantities of particles are treated in conventional coating apparatus.

Among the features that promote the achievement of a sufficient fluidization to treat such high volumes of particles, included is a fluid inlet design that provides a laminar flow of fluid, such as fluidizing air, directly through the bottom of the coating apparatus. A fluid flow passage leading to the bottom of the coating apparatus directs the laminar flow of air in a substantially vertically upward path such that the flow of fluid is laminar as it enters the fluid inlet of the coating apparatus. Because the fluid passage leading to the fluid inlet is linear, very little turbulence of the fluid flow occurs as the fluid flow enters the apparatus.

Another feature that promotes the ability of the coating apparatus to fluidize such large particle beds is the provision of a fluid distribution section or area of a substantially constant average diameter adjacent the inlet, or which is part of the inlet. By substantially constant diameter, what is meant is a diameter that is constant, or that can slightly converge or diverge as long as the convergence or divergence does not introduce turbulence into the flow of fluid passing through the section. The fluid distribution area extends for a length along the fluid flow path prior to reaching the fluid distribution plate. The fluid distribution area with its constant diameter provides a laminar flow of fluid to the fluid distribution plate that enables an even and uniform distribution of the fluid flow through the various openings in the fluid distribution plate. In addition, the fluid distribution area, provides an area of laminar flow and an ideal location for measuring flow properties such as volume and temperature. As a result of the fluid distribution area design, the fluid flow reaching and passing through the fluid distribution plate is substantially non-turbulent.

Another feature of the present invention that aids in providing thorough, even and uniform fluidization of an entire large particle bed within the coating apparatus is the provision of at least a first diverging section in communication with, or as a part of, a chamber. For example, a first diverging section is provided adjacent the fluid distribution plate according to embodiments of the present invention. The first diverging section includes a first diameter at a lower end thereof that is substantially identical to the average diameter of the adjacent fluid distribution plate. As the first diverging section extends upwardly, in the downstream direction relative to the fluid flow, the section diverges to a second average diameter that is greater than the first average diameter at the lower end of the first diverging section. As the flow of fluid passes through the fluid distribution plate it expands to conform to the expanding diameter of the first diverging section, thus reducing average and local air velocities. The sloped sides of the first diverging section direct fluidized particles settling at the bottom of the coating apparatus toward the fluid distribution plate where they are refluidized by the evenly distributed flow of fluid passing through the plate.

After the flow of fluid passes through the first diverging section, it then passes through a chamber. In cases where the first diverging section is considered part of the chamber, the flow of fluid would then be considered to pass through a portion of the chamber referred to herein as the chamber proper. As the flow of fluid passes up through the chamber, the velocity of the flow is such that particles from the fluidized bed are no longer supported by the flow of fluid and fall down toward the fluid distribution plate. Because the chamber or chamber proper preferably has a constant diameter along its length, a laminar, non-turbulent flow of fluid is produced through the chamber.

Another feature of the present invention that further renders the invention applicable to the treatment of such large particle beds is the provision of a second diverging section that intersects with and is positioned downstream of the chamber. The second diverging section is also referred to herein as a chamber expansion and includes a first or lower average diameter that is substantially identical to the average diameter of the adjacent chamber at the intersection of the chamber and the second diverging section. The second diverging section has a second or upper average diameter that is larger than the first or lower average diameter, and an annular, sloped sidewall that diverges in the direction of flow of fluid through the section. A top portion of the second diverging section is in communication with one or more wide fluid exhaust outlets or ports that carry the fluid flow away from the coating apparatus.

To prevent coated or uncoated particle from flowing out of the apparatus through the wide fluid exhaust outlet, fluid outlet deflector plates are provided to better distribute the outgoing fluid. In a preferred embodiment of the present invention, the wide fluid exhaust outlet comprises two separate outlets on substantially opposite sides of the second diverging section, enabling a more even distribution of fluid flow exhausted from the apparatus than would be achieved from a device having a singular outlet. Preferably, the wide fluid exhaust outlet or outlets provide exhaust openings that extend around about 25% or more of the periphery of a top portion of the second diverging section. The second diverging section may preferably include a portion having a length of constant average diameter where the wide fluid exhaust outlet or outlets communicate with the coating apparatus. Preferably, the arc length of the wide fluid outlet or outlets around the top of the apparatus is collectively from about 10% to about 80% of the average diameter of the chamber and from about 8% to about 60% of the inner periphery of the top portion of the apparatus.

Various combinations of the design features mentioned above enable the achievement of a coating apparatus that can use significantly higher air volumes than traditional coating apparatus. The result is an increased coating capacity and a reduction in manufacturing fixed costs. In addition, the capital costs to manufacture the apparatus and its peripheral system components, such as valves, fans, buildings, tanks, and control systems, is relatively much less, for example, 60% or less, than the relative cost to build a plurality of traditional smaller-sized coaters that would be necessary to achieve the same output capacity. It might be expected that, relative to a traditional coating apparatus having a maximum flow of 30,000 m$^3$/hr, the flow could be doubled without significant particle waste if the cross-sectional average diameter of the chamber is doubled. However, it has been found according to the present invention that by doubling the cross-sectional average diameter of the chamber and providing the features of the present invention, fluid flows of much greater than double the 30,000 m$^3$/hr rate can be used, for example, flows of up to 100,000 m$^3$/hr or more. As a result of the present design, particle beds up to and exceeding 10,000 metric tons can be treated or formed in accordance with the present invention.

The accompanying drawings and the following description of those drawings exemplify the present invention and illustrate embodiments thereof, but are in no way intended to limit the scope of protection set forth in the appended claims.

The dimensions shown in all the drawings are in meters and the one digit and two digit reference numerals refer to various components of the coating apparatus. FIG. 1 is a side view of a coating apparatus according to an embodiment of the present invention. As can be seen in FIG. 1, a fluid inlet 10 is provided at the bottom of the coating apparatus 8. The inlet 10 is connected to a supply line 12 that supplies a flow of fluid from below the coating apparatus. The flow of fluid through supply line 12 is preferably directed vertically upward into inlet, 10 and is preferably supplied through a straight conduit such that a laminar flow of fluid enters inlet 10 as opposed to a turbulent flow as would occur from a bent, curved or elbow-jointed supply conduit. A flow of fluid passing through inlet 10 reaches an inlet expansion section 14 in the form of a hollow cone having an increasing diameter from the bottom of the section to the top of the section. Preferably, the cross-sectional shape of inlet 10, supply conduit 12 and inlet expansion section 14, are each circular, although other cross-sectional shapes could be used.

The inlet expansion section 14 intersects at its widest average diameter with a fluid distribution area 16 having a constant average diameter along its length. Herein, it is to be understood that the length dimension of the various components described in connection with the coating apparatus refers to the distance from the lower end of the component (as shown in FIG. 1) to the upper end of the component, or, in other words, the direction of fluid flow through the apparatus. Thus, the length of the inlet expansion section 14 is 3.418 meters in the embodiment shown in FIG. 1 and the length of inlet 10 is 0.182 meters.

The air distribution section 16 intersects with the inlet expansion section 14 at a bottom end of fluid distribution section 16, and section 16 intersects with a fluid distribution plate 18 at an upper end of section 16. The fluid distribution plate may preferably be a screen having a plurality of openings evenly distributed throughout. The openings are in the form of through passages that allow fluid flow coming through fluid distribution section 16 to pass evenly through the various openings of the distribution plate. Due to the constant average diameter along the length of fluid distribution section 16, the flow of fluid reaching the fluid distribution plate 18 is substantially laminar and non-turbulent. As a result, fluid passing through the fluid distribution plate 18 is evenly distributed throughout a bed of particles resting on or above the plate. In a preferred embodiment of the present invention, the air distribution plate comprises openings that make up less than 10% of the surface area on one side of the fluid distribution plate, more preferably, from about 5% to about 8% of the total surface area on one side of the air distribution plate, for example, from about 5% to about 6% of the total surface area on one side of the plate.

Immediately above the air distribution plate 18 is a first diverging section 20 in the embodiments shown in FIGS. 1 and 5. The first diverging section 20 has a lower end of a first or lower average diameter and an upper end having a second or upper average diameter that is greater than the first or lower average diameter. At the lower end of first diverging section 20 is a slot-like opening, preferably in the form of an annular opening. The opening permits the discharge of coated particles produced by the coating apparatus. The opening remains closed by a discharge ring 22 that can be lifted from a closed position to open the discharge opening. Discharge ring 22 has a sloped sidewall that diverges in an upward direction such that the upper diameter of discharge ring 22 is greater than the lower diameter of discharge ring 22. The discharge ring 22, discharge opening it covers, and a discharge assembly that employs the discharge ring are substantially as described in copending U.S. patent application Ser. No. 09/213,638, which is incorporated herein in its entirety by reference. Modification has been made, however, relative to the design described in the application, to enable the inlet expansion section 14 and fluid distribution section 16 to be symmetrical, particularly, of circular cross-section along the entire lengths thereof.

At the upper end of first diverging section 20, the section 20 intersects with a chamber 24. Chamber 24 has a constant average diameter along the length thereof and intersects at an upper end thereof with a second diverging section 26. The chamber 24 preferably has a significantly larger diameter than the diameter of fluid distribution section 16, for example, chamber 24 has an average diameter that is from about 20% larger to about 40% larger than the average diameter of the fluid distribution section 16. Due to the relatively larger average diameter of the chamber 24, the fluid flow velocity is relatively low through the chamber 24, such that particles and coated particles in the coating apparatus fall in the chamber 24 toward the air distribution plate 18. The fluid flow through the chamber 24 is preferably insufficient to carry particles and coated particles through the coating apparatus and out the exhaust outlets. For high capacity manufacturing of coated particles, the average diameter of the chamber is preferably three meters or more, and more preferably 3.5 meters or more, for example, 4.0 meters or more.

About 1.0 meter up from first diverging section 20 in chamber 24, a fluid and particle deflection plate 23 is provided. The fluid and particle deflection plate 23 extends across chamber 24 and is designed to break up eruptive fluid and particle surges rising from the bed of particles being treated. The fluid and particle deflection ark plate 23 is preferably circular, extends across the entire chamber 24, and has a zigzag or corrugated and largely perforated design. Preferably, the fluid and particle deflection plate 23 is not designed to prevent the passage of particles therethrough, but rather, is designed to break up eruptive surges of particles and fluid.

About midway up on the sidewall of chamber 24 a loading port (not shown) is provided for loading a bed of seed or core starting particulate material.

The second diverging section 26 even further reduces the fluid flow velocity due to the diverging diameter of the section. Because of the extremely wide average diameter at the top of second diverging section 26, the fluid flow velocity entering top section 28 of the coating apparatus is such that particles and coated particles within the coating apparatus rarely reach the wide fluid exhaust outlets 30 and 32 under normal operating conditions, which can include fluid flows of 80,000 m$^3$/hr or more. The widest portion or top end of the second diverging section can have an average diameter of about 5 meters or more.

The wide fluid exhaust outlets intersect the chamber outlet at an exhaust port, and the exhaust port has a cross-sectional area that is from about 20% to about 60% of the cross-sectional area of the chamber. 12. The wide fluid exhaust outlet may extend around about 50% or more of the inner periphery of a top portion of the chamber. The wide fluid exhaust outlet may extend around about 50% or more of the inner periphery of the second end of the second diverging section.

Preferably, the cross-sectional shapes of each of the inlet 10, inlet expansion chamber 14, fluid distribution section 16, first diverging section 20, chamber 24, second diverging section 26, and top section 28, are all symmetrical along the entire lengths thereof. Preferred cross-sectional symmetrical shapes according to the present invention are circular shapes. A central dotted line of symmetry is shown in FIGS. 1 and 5. The various section of the apparatus can be made separately and then connected together or can be integrally made together.

The coating apparatus can further include a source of fluid flow in communication with either the fluid inlet or the wide fluid exhaust outlet. The source is adapted for causing a flow of fluid through the coating apparatus in a direction from the fluid inlet, through the fluid distribution plate, through the chamber, and out said wide fluid exhaust outlet. The source of fluid flow preferably includes a vacuum source in communication with the exhaust outlet, for example a fan. The source of fluid flow preferably provides a flow of fluid of about 50,000 m$^3$/hr or more, for example, a flow of fluid of about 65,000 m$^3$/hr or more, even a flow of fluid of about 80,000 m$^3$/hr or more.

FIG. 2 is a top view of the top section 28 of the coating apparatus and shows top section 28, wide fluid exhaust outlet 30, wide fluid exhaust outlet 32, and fluid outlet deflection plates 34. After the fluidizing fluid passes through the coating apparatus and into exhaust outlets 30 and 32, the fluid encounters fluid outlet deflection plates 34 which evenly distribute outgoing fluid for passage through exhaust conduits 36, 38, or through an exhaust manifold. The fluid outlet deflection plates 34 include evenly distributed holes with openings that make up from about 20% to about 80% of the area of the plates, for example, about 50% of the area of the plates. The plates 34 cover about 80% of the exhaust outlet openings. The fluid outlet deflection plates 34 preferably eliminate, or at least minimize, acceleration of fluid flow at the wide fluid exhaust outlets 30 and 32. Preferably, the exhaust conduits are of equal size and equally distribute outgoing fluid. The exhaust conduits are preferably perpendicular to the chamber 24.

FIG. 5 is another embodiment of the present invention having substantially similar features to the embodiment shown in FIG. 1, but with some different dimensions and a dust explosion chamber 40. As can be seen in FIG. 5, the dust explosion chamber 40 has a constant average diameter along its length and in the embodiment shown the average diameter is 3.800 meters. A converging section 42 is provided in the embodiment shown and connects dust explosion chamber 40 with the top portion 28 of the coating apparatus. Dust explosion chamber 40 is provided with a sealed cover. The dust explosion chamber 40 is preferably provided with flaps to deflect an explosive force in the event of an explosion.

FIG. 3 is a top view of the top section 28 shown in FIG. 1, illustrating wide fluid exhaust outlets 30 and 32, exhaust conduits 36, 38 and flanges 31 and 33 that connect outlets 30 and 32 to conduits 36 and 38, respectively. Deflection plates 34 are not shown in FIG. 3.

FIG. 4 is a side view of a discharge apparatus 50 used in the embodiments of FIGS. 1 and 5. The side discharge apparatus is substantially similar to the side discharge assembly described in U.S. patent application Ser. No. 09/213,638, which application is incorporated herein in its entirety by reference. The side discharge assembly is modified relative to that shown in U.S. application Ser. No. 09/213,638 such that the components of the side discharge assembly 50 do not interfere with the symmetrical design of the coating apparatus, inlet 10, inlet expansion section 14, fluid distribution area 16, fluid distribution plate 18 or the first diverging section 20. Discharge assembly 50 is provided with an outlet 52 from which product discharged from the coating apparatus can be dumped into a container, hopper, or other containment device.

The coating apparatus can also include a coating device such as a spraying device and may include the spraying device described in U.S. patent application Ser. No. 09/219,275, which is incorporated herein in its entirety by reference. An agitation system can also be included in the coating apparatus and may include the system described in U.S. patent application Ser. No. 09/213,801, which is incorporated herein in its entirety by reference.

Although the coating apparatus and method of the present invention are particularly well suited for processing extremely large particle beds, the apparatus and method can also advantageously be put to use in processing much smaller particle beds, for example, particle beds weighing 100 kilograms (kg) or less. As with processing larger particle beds, smaller particle beds can be processed due to the symmetrical design of the coating apparatus under conditions which achieve better and more uniform particle coating properties, higher yields, less loss of particles through the fluid outlets, and better overall fluidization and processing characteristics.

The present invention also relates to a method of coating particles of a bed of particles. The method includes the steps of: disposing a bed of particles in a coating apparatus of the present invention; operating a source of fluid flow to force a flow of fluid through the bed of particles; fluidizing the bed of particles with the flow of fluid to form a fluidized bed of particles; and coating the fluidized bed of particles with a coating device. The method can include providing a flow of greater than about 50,000 m³/hr, such as greater than 65,000 m³/hr, or greater than 80,000 m³/hr.

Throughout the fluidization coater, a symmetrical, even and homogenous flow of fluid is provided. The apparatus can be used in a method of treating particles that benefits from increased capacity, less product loss, better heat transfer, better and more uniform coating properties, better drying capacity, better fluidization, and an overall better use of energy compared to conventional fluidization coaters.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:

1. A fluidized bed coating apparatus comprising a fluid inlet adapted to be connected to a source of fluidizing fluid, said fluid inlet comprising an entrance opening having a first diameter, an exit opening having a second diameter larger than said first diameter, an expanding inlet section between said entrance opening and said exit opening and having an average diameter that increases in a direction from said entrance opening to said exit opening, and a fluid distribution section of substantially constant average diameter adjacent said expanding inlet section;

a fluid distribution plate adjacent said fluid distribution section and having a plurality of through-passages to allow the passage of fluid therethrough;

a chamber having a chamber inlet and a chamber outlet, wherein said fluid distribution plate is positioned between said fluid distribution section and said chamber inlet, said chamber including at least a first diverging section having an average diameter that increases in the direction from said chamber inlet downstream toward said chamber outlet, said first diverging section providing an air flow velocity downstream of said first diverging section that is substantially slower than the air flow velocity of fluid flowing upstream of the first diverging section; and a fluid outlet downstream of said chamber outlet for exhausting fluidizing fluid from said coater.

2. The coating apparatus of claim 1, wherein said fluid outlet intersects with said chamber outlet at an exhaust port, wherein said exhaust port has a cross-sectional area that is from about 20% to about 60% of the cross-sectional area of said chamber.

3. The coating apparatus of claim 1, wherein said chamber includes a second diverging section, said second diverging section comprising a first end having a third average diameter and a second end downstream of said first end and having a fourth average diameter, wherein said fourth average diameter is larger than said third average diameter, and wherein said second diverging section is downstream from said first diverging section and the second end of said second diverging section is in communication with said exhaust outlet.

4. The coating apparatus of claim 1, further comprising a source of fluid flow in communication with either said fluid inlet or said fluid outlet and adapted for causing a flow of fluid through said coating apparatus in a direction from said fluid inlet, through said fluid distribution plate, through said chamber, and out said fluid outlet.

5. The coating apparatus of claim 4, wherein said source of fluid flow comprises a vacuum source in communication with said exhaust outlet.

6. The coating apparatus of claim 5, wherein said vacuum source comprises a fan.

7. The coating apparatus of claim 1, further comprising a treated particle discharge device for discharging coated particles that have been treated in said coating apparatus.

8. The coating apparatus of claim 7, wherein said discharge device includes a hollow conical discharge ring that can raise and lower to open or close an annular opening downstream of the fluid distribution plate to permit the discharge of coated particles from inside said coating apparatus through said annular opening.

9. The coating apparatus of claim 1, wherein said exhaust outlet includes openings on opposite sides of said chamber.

10. The coating apparatus of claim 1, wherein said exhaust outlet comprises an annular opening at a top portion of said chamber.

11. The coating apparatus of claim 3, wherein said exhaust outlet comprises two or more openings spaced from each other at a top portion of said second diverging section.

12. The coating apparatus of claim 1, wherein said exhaust outlet extends around about 50% or more of the inner periphery of a top portion of said chamber.

13. The coating apparatus of claim 3, wherein said exhaust port extends around about 50% or more of the inner periphery of the second end of said second diverging section.

14. The coating apparatus of claim 4, wherein said source of fluid flow provides a flow of fluid of about 50,000 m³/hr or more.

15. The coating apparatus of claim 4, wherein said source of fluid flow provides a flow of fluid of about 65,000 m³/hr or more.

16. The coating apparatus of claim 4, wherein said source of fluid flow provides a flow of fluid of about 80,000 m³/hr or more.

17. The coating apparatus of claim 1, wherein the combined cross-sectional areas of the through-openings in said fluid distribution plate equal about 10% or less of the total cross-sectional area of said plate.

18. The coating apparatus of claim 1, wherein the combined cross-sectional areas of the through-openings in said plate equal from about 5% to about 8% of the total cross-sectional area of said plate.

19. The coating apparatus of claim 1, wherein said fluid inlet is connected to a fluid supply line that supplies a laminar flow of fluid to said fluid inlet.

20. The coating apparatus of claim 1, wherein said chamber has an average diameter of greater than about 3 meters.

21. The coating apparatus of claim 1, wherein said chamber has an average diameter of greater than about 4 meters.

22. The coating apparatus of claim 3, wherein said fourth diameter is about 5 meters or greater.

23. The coating apparatus of claim 1, further comprising a load of coated particles within said coating apparatus, wherein said load comprises at least about 5 metric tons of coated particles.

24. The coating apparatus of claim 1, further comprising a load of coated particles within said coating apparatus, wherein said load comprises at least about 10 metric tons of coated particles.

25. A method of fluidizing particles of a bed of particles, comprising:

disposing said bed of particles in the coating apparatus of claim 1;

operating a source of fluid flow to force a flow of fluid through said bed of particles; and fluidizing said bed of particles with said flow of fluid to form a fluidized bed of particles.

26. The method of claim 25, further comprising coating said fluidized bed of particles with a coating device.

27. The method of claim 25, wherein said source of fluid flow provides a flow of greater than about 50,000 $m^3$/hr or more.

28. A method of fluidizing particles of a bed of particles in a coating apparatus, comprising disposing a bed of particles on a first side of a fluid distribution plate having a plurality of through-passages to allow the passage of fluid therethrough; and directing a laminar flow of fluid to a second side of said fluid distribution plate, opposite said first side, to fluidize said bed of particles.

29. The method of claim 28, further comprising exhausting a flow of fluid resulting from directing said laminar flow through an exhaust outlet comprising two or more openings spaced from each other, after said laminar flow fluidizes said bed of particles.

* * * * *